(12) United States Patent
Tuscano et al.

(10) Patent No.: US 9,511,537 B2
(45) Date of Patent: Dec. 6, 2016

(54) BONDING TOOL, SYSTEM TO APPLY PRESSURE DURING A BONDING PROCESS AND METHOD TO APPLY PRESSURE DURING A BONDING PROCESS

(71) Applicant: Sikorsky Aircraft Corporation, Stratford, CT (US)

(72) Inventors: Mark A. Tuscano, Stratford, CT (US); Michael Haiday, Bethany, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 487 days.

(21) Appl. No.: 13/926,537

(22) Filed: Jun. 25, 2013

(65) Prior Publication Data

US 2014/0374021 A1   Dec. 25, 2014

(51) Int. Cl.
| | |
|---|---|
| *B29C 63/16* | (2006.01) |
| *B30B 1/00* | (2006.01) |
| *B30B 5/02* | (2006.01) |
| *B29C 43/10* | (2006.01) |
| *B29C 43/36* | (2006.01) |

(52) U.S. Cl.
CPC ............... *B29C 63/16* (2013.01); *B29C 43/10* (2013.01); *B29C 43/3642* (2013.01); *B30B 1/003* (2013.01); *B30B 5/02* (2013.01); *B29C 2043/3649* (2013.01)

(58) Field of Classification Search
CPC .............. B30B 1/003; B30B 5/02; B30B 7/03; B30B 7/04; B29C 2043/3649; B29C 43/10; B29C 43/3642; B29C 63/16; B32B 37/10
See application file for complete search history.

(56) References Cited

U.S. PATENT DOCUMENTS

| | | | |
|---|---|---|---|
| 3,799,700 A | 3/1974 | Broekhuizen et al. | |
| 5,139,604 A * | 8/1992 | Mitchell | B29C 63/04 100/211 |
| 5,573,622 A | 11/1996 | Hass et al. | |
| 5,755,558 A | 5/1998 | Reinfelder et al. | |
| 5,939,007 A | 8/1999 | Iszczyszyn et al. | |
| 5,972,140 A | 10/1999 | Hass et al. | |
| 6,083,343 A | 7/2000 | Adams et al. | |
| 7,114,751 B2 | 10/2006 | Reynolds, Jr. | |
| 7,744,974 B2 | 6/2010 | Pearson et al. | |
| 8,293,051 B2 | 10/2012 | Morris et al. | |
| 8,307,872 B2 | 11/2012 | Kendall et al. | |
| 8,313,155 B2 | 11/2012 | Schiers | |
| 8,333,859 B2 | 12/2012 | Laker et al. | |
| 2004/0183227 A1 | 9/2004 | Velicki et al. | |
| 2009/0199946 A1* | 8/2009 | Sommer | B23K 20/023 156/60 |
| 2010/0015265 A1 | 1/2010 | Vontell | |
| 2011/0259515 A1* | 10/2011 | Rotter | B29C 70/382 156/285 |

(Continued)

*Primary Examiner* — Christopher Schatz
(74) *Attorney, Agent, or Firm* — Cantor Colburn LLP

(57) ABSTRACT

A bonding tool to facilitate bonding of a liner to a surface of a workpiece is provided. The bonding tool includes a bladder, which is inflatable from an initial size to an expanded size, a frame formed to define a recess in which the bladder is disposed, the recess being oriented such that, when inflated from the initial size to the expanded size, the bladder applies a predefined pressure to the liner such that the liner is pressed against the surface of the workpiece.

11 Claims, 4 Drawing Sheets

(56) References Cited

U.S. PATENT DOCUMENTS

2012/0125534 A1\* 5/2012 Watson .................. B29C 73/10
                                                   156/285
2013/0022702 A1   1/2013 Morris et al.
2013/0025765 A1   1/2013 Kendall et al.

\* cited by examiner

BONDING TOOL, SYSTEM TO APPLY PRESSURE DURING A BONDING PROCESS AND METHOD TO APPLY PRESSURE DURING A BONDING PROCESS

STATEMENT REGARDING FEDERALLY SPONSORED RESEARCH OR DEVELOPMENT

This invention was made with government support under Contract No. N00019-06-C-0081 awarded by the Department of the Navy. The government has certain rights in this invention.

BACKGROUND OF THE INVENTION

The subject matter disclosed herein relates to a bonding tool, a system to apply pressure during a bonding process and a method to apply pressure during a bonding process.

When a part requires bonding of an element (such as a liner), a bonding tool is used to bond the element to the part using pressure. Current bonding tools that apply pressure to bonding liners rely upon springs, clamps and rubberized elements that cannot evenly apply pressure to each bonding liner. In more complicated systems, vacuum bags are employed. Typically, such systems include a bag element that is laid on a part and a sealed vacuum connector coupled to the bag element. The vacuum connector is engaged and draws a full vacuum out of the bag element. This causes the bag element to impinge upon any liners interposed between the bag element and the part such that the liners are pressed onto the part.

An issue with the vacuum bag systems exists, however, in that under most normal circumstances, the amount of pressure that can be generated is limited to 1 atmosphere or about 14.7 psi. This issue is compounded when bonding processes require an application of heat that affects an amount of pressure in a system.

BRIEF DESCRIPTION OF THE INVENTION

According to one aspect of the invention, a bonding tool to facilitate bonding of a liner to a surface of a workpiece is provided. The bonding tool includes a bladder, which is inflatable from an initial size to an expanded size, a frame formed to define a recess in which the bladder is disposed, the recess being oriented such that, when inflated from the initial size to the expanded size, the bladder applies a predefined pressure to the liner such that the liner is pressed against the surface of the workpiece.

According to another aspect of the invention, a system to apply pressure during a bonding process is provided. The system includes a base on which a workpiece is disposable, a bonding tool including a frame and a bladder disposed in the frame, the frame being disposed such that, when a liner is interposed between the bladder and a surface of the workpiece while on the base and the bladder is inflated, the bladder applies a predetermined pressure which presses the liner toward the surface and a controller operably coupled to the bladder, the controller being configured to control an inflated condition of the bladder such that the pressure applied by the bladder to the liner are known.

According to yet another aspect of the invention, a method to apply pressure during a bonding process is provided and includes disposing a heating element proximate to a workpiece, the workpiece including a surface with a liner proximate to the surface, disposing a bonding tool such that the liner is between the surface and the bonding tool, the bonding tool having a frame to define a recess and an inflatable bladder in the recess where the recess is oriented such that the bladder applies pressure to the liner when inflated such that the liner is pressed toward the surface and controlling a temperature of the heating element and an inflated condition of the bladder to maintain a predetermined temperature and pressure at an interface of the liner and the surface.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below relates to a bonding tool, a system to apply pressure during a bonding process and a method to apply pressure during a bonding process. The bonding tool, the system and the method include a heating element to apply heat to a workpiece having a bonding surface to which a liner is to be bonded, a bladder that is configured to be inflated such that the inflation of the bladder generates pressures in the bonding direction and a controller that is operably coupled to the heating element and the bladder to control a temperature of the heating element and an inflated condition of the bladder. In accordance with embodiments, the bonding surface of the workpiece, the liner and the bladder may each be plural in number. In addition, as will be described below, the system may include one or more bonding tools.

Figure 1:
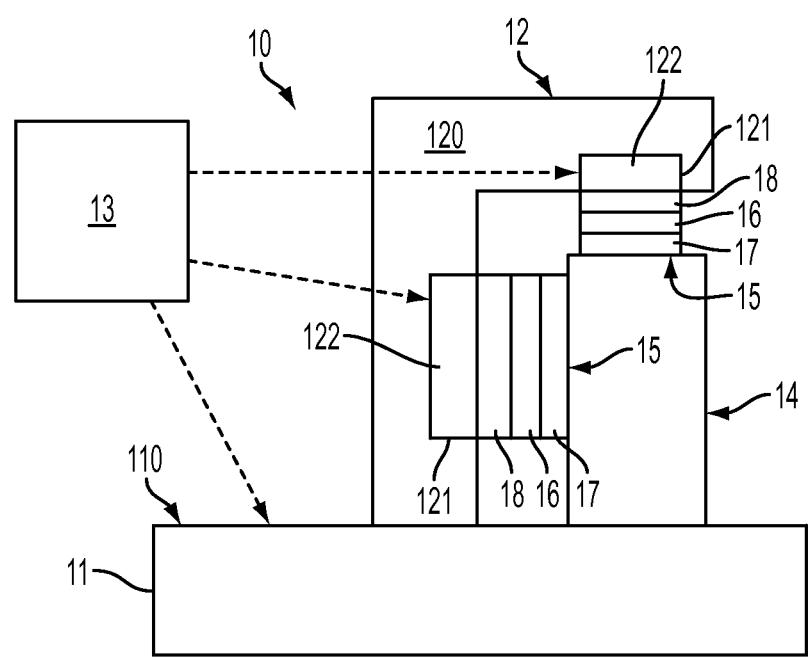
FIG. 1 is a schematic view of a system to apply pressure during a bonding process according to an embodiment.

With reference to FIG. 1, a system 10 is provided to apply substantially uniform and known pressures during a bonding process to aid in the bonding of two elements, for example, a liner 16 to a bonding surface 15 of a workpiece 14. The system includes a base or heating element 11, a bonding tool 12 and a controller 13. The heating element 11 includes an upper surface 110 on which the workpiece 14 including one or more bonding surfaces 15 is disposable with one or more liners 16 positioned proximate to the bonding surfaces 15. Adhesive 17 may be provided between the liners 16 and the bonding surfaces 15. While described in terms of a workpiece 14 and a liner 16, it is understood that aspects of the invention can be utilized where any two elements are pressed together, and that the separate adhesive 17 need not be used in all aspects such as where the liner 16 has adhesive properties.

The bonding tool 12 includes a frame 120, which is formed to define one or more recesses 121, and one or more bladders 122 that are disposed in the recesses 121. The frame 120 is disposed such that the liners 16 are respectively interposed between the bonding surfaces 15 and the bladders 122. One or more tooling blocks 18 may be provided between the bladders 121 and the liners 16 as shown or may be omitted according to the shape of the bladder 122. While shown as a single bladder 122 in each recess 121, it is understood that each recess 121 may include multiple bladders 122, such as where each bladder 122 is of a standard width. Where multiple bladders 122 exist in the recess 121, the tooling block 18 may be used to more evenly distribute the pressure exerted by the bladders 122 during the bonding process as will be explained below.

The controller 13 is operably coupled to the heating element 11 and the bladders 122. The controller 13 is thereby configured to control a temperature of the at least the upper surface 110 of the heating element 11 and an inflated condition of the bladders 122. In so doing, the controller 13 is configured to cause the heating element 11 to heat the workpiece 14 to an appropriate bonding temperature at which the liners 16 can be bonded to the bonding surfaces 15 and to inflate the bladders 122 to a predefined internal pressure (e.g., about 25-60 psi). While not limited thereto, the controller 13 can include a processor which reads computer software or firmware encoded on a computer readable medium, and controls a pump to control pressure in the bladders 122 and the heating element 11. In such an embodiment, the controller 13 can follow a pre-programmed bonding process having multiple pressurization and heating changes while monitoring the pressures and temperatures being applied over time. In this way, the controller 13 can provide zoned heating and pressurization during the bonding process such that individual liners needing different heating and/or pressures can be accommodated simultaneously. For instance, the zones approach allows the thickest areas to be brought to the desired temperature at the same time as the thinnest areas. However, it is understood that the controller 13 can also be a set of manual controls in addition to or instead of the processor.

The inflation of the bladders 122 causes the bladders 122 to increase in size and to grow in directions based on the orientation of the recesses 121 and the bladders 122. Such growth causes the bladders 122 to eventually impinge upon the liners 16 directly or by way of the tooling blocks 18 to thereby apply substantially uniform and known predefined pressures to the liners 16 during the bonding process. While not restricted thereto, the shown bladders 122 are pneumatic bladders 122. However, it is understood that the gas used in the bladders 122 can be any gas in addition to or instead of air, and that the bladders 122 can also be used with non-gasses, such as hydraulic bladders.

In accordance with aspects of the invention, a magnitude of the predefined pressures applied by the bladders 122 to the liners 16 is directly proportional to the internal pressure of the bladders 122 and is unrelated to the temperature of the upper surface 110 or the workpiece 14. However, it is understood that aspects of the invention could incorporate a heating element within the bladder 122 in addition to or instead of the heating element 11, such as where the gas or fluid within the bladder 122 is heated to a temperature suited to the bonding process being employed.

Figure 2:
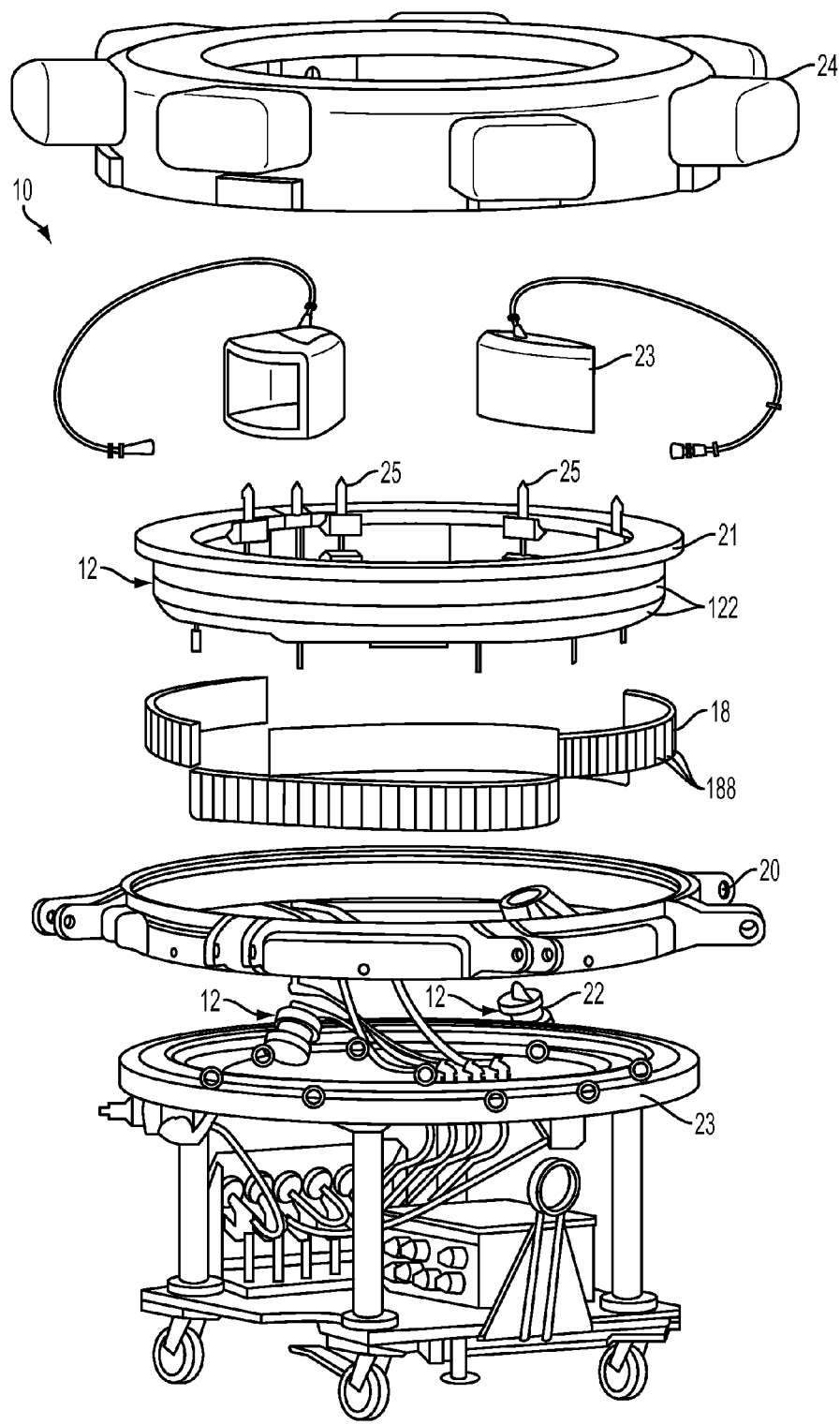
FIG. 2 is an exploded perspective view of a bonding tool and a workpiece according to an embodiment.

With reference to FIG. 2, in a particular application of the system 10, the bonding tool 12 is provided to facilitate an assembly of a swashplate 20 for rotormachines or helicopters. In this case, the bonding tool 12 is plural in number and provided as an annular bonding tool 21 or additional scissor lug bonding tools 22 while the swashplate 20 is provided as the above-noted workpiece 14. As shown in FIG. 2, the swashplate 20 is generally annular in shape and may be arranged on a periphery of the base 23, which is provided as the above-noted heating element 11. The liners (not shown) are arranged in an interior of the swashplate 20. The annular bonding tool 21 and the additional scissor lug bonding tools 22 are each disposed in an interior defined by the liners. Further components 23 of the swashplate 20 are disposed in an interior of the annular bonding tool 21 and a cover 24 is disposable to surround the swashplate 20. Lastly, plural tooling blocks 18 are disposed between the bladders 122 of the annular bonding tool 21 and the liner to press the liner against swashplate 20 when the bladders 122 are inflated.

The annular bonding tool 21 and the additional scissor lug bonding tools 22 are each provided with pressure nozzles and hoses 25 that are connectable with the controller 13. The pressure nozzles and hoses 25 permit fluid ingress into the respective bladders 122 such that the annular bonding tool 21 exerts radially outwardly directed pressures onto the liners 16 and the swashplate 20, which surrounds the annular bonding tool 21, and such that the additional scissor lug bonding tools 22 exert similarly outwardly directed pressures onto corresponding components of the swashplate 20. As shown, the bladders 122 are of generally uniform width and are disposed parallel to each other, but are sufficiently flexible to be inserted into cavities 121 of varied shapes to provide customizable bonding interfaces between the tool 12, the liner 16 and the workpiece 14. However, the invention is not limited to bladders 122 of like size, and the surface width and shape of the bladders 122 can be adjusted according to the interface requirements of the surface 15.

As shown in FIG. 2, the tooling blocks 18 may each include a plurality of vertically oriented, polytetraflouroethylene (PTFE) coated slots 188 that are arranged in a horizontal array. In such embodiments, each slot 188 may be pivoted about a hinge formed being the slot 188 and an adjacent slot 188 such that the tooling blocks 18 as a whole can be fashioned in the shape of the liners 16 and the bonding surfaces 15. The PTFE coatings insured that the individual slots 188 and the tooling blocks 18 as a whole are unlikely to stick to the liners 16 or the workpiece 14.

As also shown in FIG. 2, the system 10 may be portable and can be wheeled to different areas of a shop floor. However, it is understood that the system 10 can be made portable using other methods, or need not be portable in all aspects.

Figure 3:
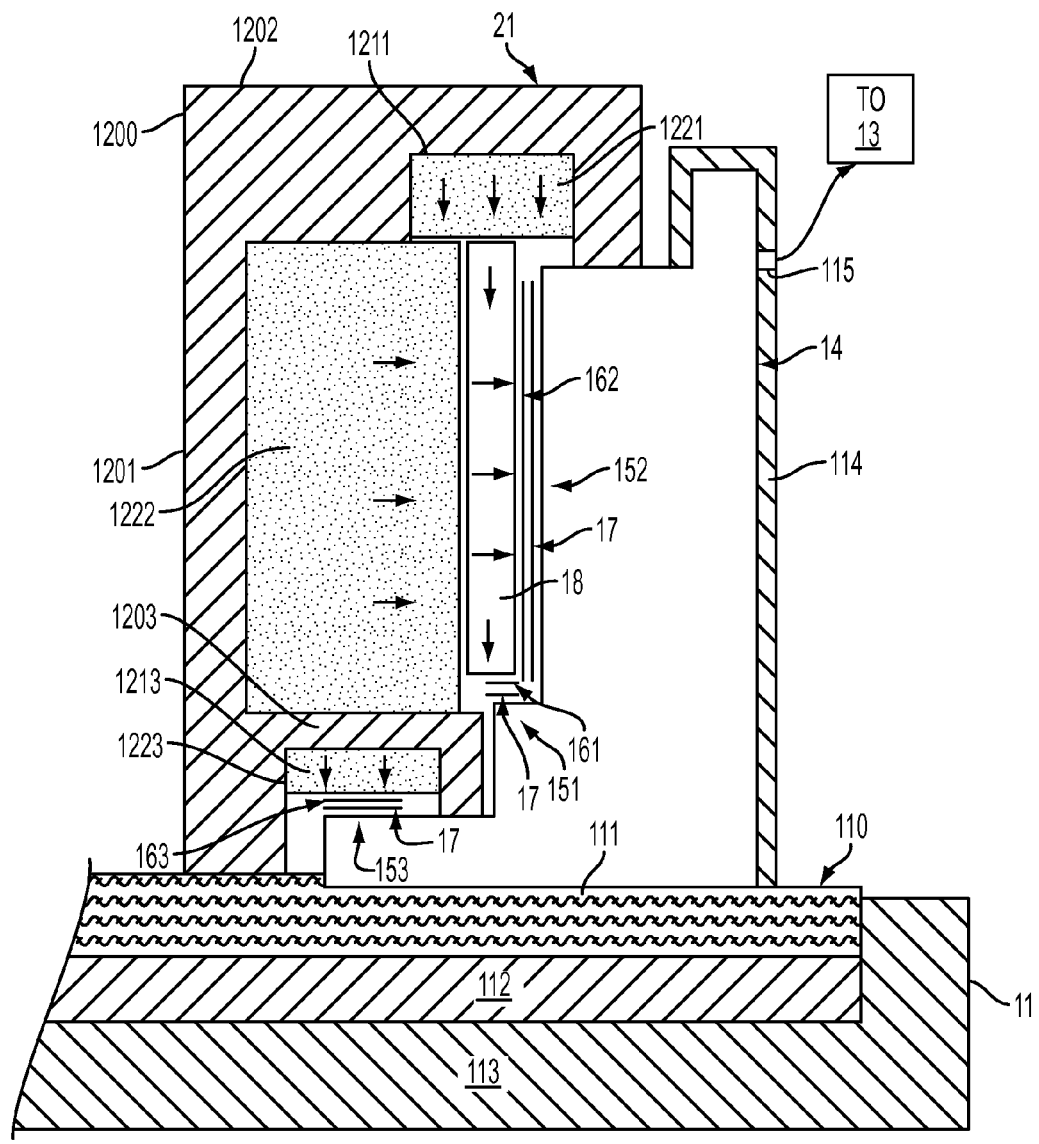
FIG. 3 is a schematic side cross-sectional view of the bonding tool and the workpiece of FIG. 2 according to an embodiment.
Figure 4:
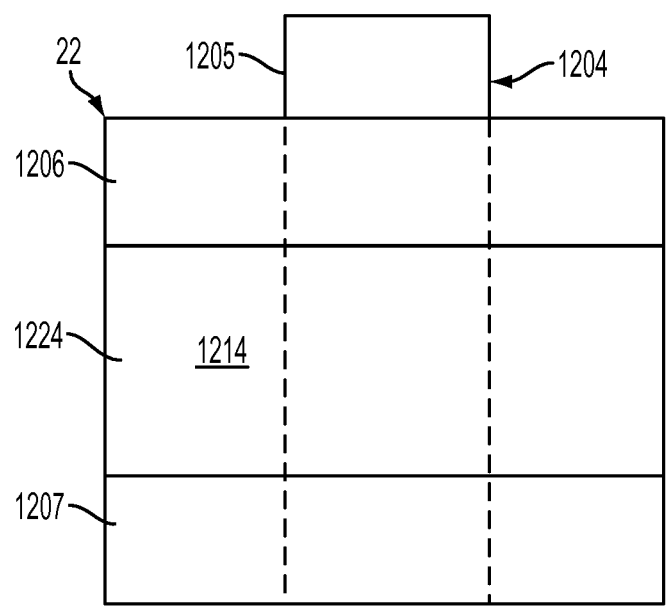
FIG. 4 is a schematic side cross-sectional view of a bonding tool in accordance with another embodiment.

With reference to FIGS. 3 and 4, embodiments of the annular bonding tool 21 and the additional scissor lug bonding tools 22 are illustrated. As shown in FIG. 3, the annular bonding tool 21 may be provided to facilitate the bonding of at least first, second and third liners 161, 162, 163 to corresponding first, second and third bonding surfaces 151, 152, 153 of workpiece 14 by way of adhesive 17. The workpiece 14 may be the swashplate 20 of FIG. 2. The annular bonding tool 21 includes first, second and third bladders 1221, 1222, 1223, which are each inflatable from an initial size thereof to an expanded size thereof, and an annular frame 1200 that is surrounded by the workpiece 14. The annular frame 1200 and the workpiece 14 are each disposable on the base or the heating element 11. The heating element 11 includes a heat source 111 at the upper surface 110, an insulator 112 underneath the heat source 111 and a base plate 113 underneath the insulator 112. At least tooling block 18 may be provided between first bladder 1221 and first liner 161 and between second bladder 1222 and second liner 162.

The frame 1200 includes a support member 1201, a first flange 1202 and a second flange 1203. The first flange 1202 is coupled to a distal end of the support member 1201 and is formed to define a first recess 1211 in which the first bladder 1221 is disposed or anchored. The second flange 1203 is coupled to a central portion of the support member 1201 to define a second recess 1212 between the first flange 1202 and the second flange 1203 in which the second bladder 1222 is disposed or anchored. The second flange 1203 is further formed to define a third recess 1213 in which the third bladder 1223 is disposed or anchored.

The first recess 1211 is oriented such that, as the first bladder 1221 is inflated, the first bladder 1221 exerts pressures downwardly onto the first liner 161 and toward the first bonding surface 151. The second recess 1212 is oriented such that, as the second bladder 1222 is inflated, the second bladder 1222 exerts pressures radially outwardly onto the second liner 162 and toward the second bonding surface 152. The third recess 1213 is oriented such that, as the third bladder 1223 is inflated, the third bladder 1223 exerts pressures downwardly onto the third liner 163 and toward the third bonding surface 153. Thus, the applied pressures may be directed transversely with respect to one another and one or more of the first, second and third bladders 1221, 1222 and 1223 may overlap. The controller 13 controls the inflation of the first, second and third bladders 1221, 1222 and 1223 such that the applied pressures are known and may be predefined. In accordance with embodiments, the known and predefined pressures may be in accordance with heat applied to the first, second and third liners 161, 162 and 163 or to the first, second and third bonding surfaces 151, 152 and 153.

With reference to FIG. 4, the additional scissor lug bonding tools 22 exert outwardly directed pressures onto corresponding components of the swashplate 20. For the additional scissor lug bonding tools 22, a frame 1204 is provided and includes a central member 1205 and first and second end members 1206, 1207 at opposite ends of the central member 1205 to define an annular recess 1214 in which annular bladder 1224 is disposed or anchored. The additional scissor lug bonding tools 22 operate similarly as described above.

In accordance with further embodiments of the invention and, with reference to FIG. 3, a heating blanket 114 may be operably coupled to the controller 13 and may be disposed about at least the workpiece 14. As such, the heating blanket 114 may be configured to heat the workpiece 14 alone or in combination with the other heating devices described above. In addition, a thermocouple 115 may be disposed in contact with the workpiece 14 and in signal communication with the controller 13 to monitor a heating of the workpiece 14 so that the heat provided by the heating blanket 114 and the other heating devices can be controlled. It is to be understood that the heating blanket 114 and the thermocouple 115 are applicable to other features (e.g., the components 23 of FIG. 2) described above that could be heated in accordance with the various embodiments of this invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, while described in the context of a heating element, it is understood that the heating element need not be used where heat is not required or where the heat will be provided by an external source such as an oven. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bonding tool to facilitate bonding of a liner to a surface of a workpiece, the bonding tool comprising:
    first and second bladders, which are each formed to define a fully enclosed interior and which are each inflatable from an initial size to an expanded size; and
    a frame formed to define first and second recesses in which the first and second bladders are respectively disposed, the first and second recesses being oriented such that, when inflated from the initial size to the expanded size, the first and second bladders apply a predefined pressure to the liner such that the liner is pressed against the surface of the workpiece,
    wherein the bonding tool further comprises a third recess and a third bladder and the frame comprises:
    a support member;
    a first flange coupled to a distal end of the support member, the first flange being formed to define the first recess in which the first bladder is disposed to expand in a first predominant direction; and
    a second flange coupled to a central portion of the support member to define the second recess between the first and second flanges in which the second bladder is disposed to expand in a second predominant direction transverse to the first predominant direction,
    the second flange being formed to define the third recess in which the third bladder is disposed to expand in the first predominant direction.

2. The bonding tool according to claim 1, wherein the frame is formed to be surrounded by the workpiece.

3. The bonding tool according to claim 1, further comprising a heating element configured to heat at least the workpiece.

4. The bonding tool according to claim 1, wherein complementary corners the first and second bladders overlap.

5. The bonding tool according to claim 1, further comprising a tooling block interposed between at least one of the first and second bladders and the liner.

6. The bonding tool according to claim 1, further comprising an adhesive interposed between the liner and the surface.

7. A system to apply pressure during a bonding process, the system comprising:
    a base on which a workpiece is disposable;
    a bonding tool to facilitate bonding of a liner to a surface of the workpiece and comprising a bladder, which is formed to define a fully enclosed interior and which is inflatable from an initial size to an expanded size, and
    a frame formed to define a recess in which the bladder is disposed, the recess being oriented such that, when inflated from the initial size to the expanded size, the bladder applies a predefined pressure to the liner such that the liner is pressed against the surface of the workpiece,
    the frame comprising a body and an exterior surface of the body and being formed to define the recess in the body such that the recess extends in a recess direction from a plane of the exterior surface, the bladder being disposed in the recess and the frame being disposed such that, when the liner is interposed between the bladder and the surface of the workpiece while on the base and the bladder is inflated, the bladder applies the predetermined pressure which presses the liner toward the surface;

a controller operably coupled to the bladder, the controller being configured to control an inflated condition of the bladder such that the pressure applied by the bladder to the liner is known; and a tooling block interposed between the liner and the bladder to evenly distribute bladder pressure and comprising a plurality of vertically oriented, polytetrafluoroethylene coated slots in a horizontal array.

8. The system according to claim 7, wherein the base comprises a heating element which comprises an upper surface on which the workpiece and the frame are disposable, and the controller further controls a temperature of an interface between the liner and the surface while the bladder applies the predetermined pressure.

9. The system according to claim 7, wherein:
the surface is provided as a plurality of surfaces,
the liner is provided as a plurality of liners,
the recess is provided as a first recess and a second recess, and the bladder is provided as a first bladder and a second bladder, said first bladder and said second bladder being disposed in said first recess and said second recess, respectively.

10. The system according to claim 7, further comprising adhesive interposed between the surface and the liner.

11. The system according to claim 7, wherein the controller controls the bladder to be inflated to about 25-60 psi.

* * * * *